United States Patent
Goodwin et al.

(10) Patent No.: US 8,521,529 B2
(45) Date of Patent: Aug. 27, 2013

(54) METHOD FOR SEGMENTING AUDIO SIGNALS

(75) Inventors: Michael M. Goodwin, Scotts Valley, CA (US); Jean Laroche, Santa Cruz, CA (US)

(73) Assignee: Creative Technology Ltd, Singapore (SG)

( * ) Notice: Subject to any disclaimer, the term of this patent is extended or adjusted under 35 U.S.C. 154(b) by 1080 days.

(21) Appl. No.: 10/907,851

(22) Filed: Apr. 18, 2005

(65) Prior Publication Data

US 2006/0085188 A1   Apr. 20, 2006

Related U.S. Application Data

(60) Provisional application No. 60/620,211, filed on Oct. 18, 2004.

(51) Int. Cl.
*G10L 15/06* (2006.01)

(52) U.S. Cl.
USPC .......... 704/245; 704/500; 704/278; 704/264; 704/256.3; 704/256; 704/254; 704/243; 704/241; 704/238; 704/205; 702/190; 702/158; 708/205; 707/700; 434/185; 382/229; 381/110; 360/13

(58) Field of Classification Search
USPC .......... 704/233, 240, 241, 253, 264, 243, 704/256.3, 205, 500, 278, 256, 254, 238, 704/228; 434/185; 702/190, 158; 707/700; 382/229; 381/110; 360/13
See application file for complete search history.

(56) References Cited

U.S. PATENT DOCUMENTS

| | | | | |
|---|---|---|---|---|
| 4,400,788 A * | 8/1983 | Myers et al. | | 704/241 |
| 4,587,670 A * | 5/1986 | Levinson et al. | | 704/256 |
| 4,591,928 A * | 5/1986 | Bloom et al. | | 360/13 |
| 4,713,778 A * | 12/1987 | Baker | | 704/254 |
| 4,718,093 A * | 1/1988 | Brown | | 704/243 |
| 4,797,929 A * | 1/1989 | Gerson et al. | | 704/243 |
| 5,133,010 A * | 7/1992 | Borth et al. | | 704/264 |
| 5,655,058 A | 8/1997 | Balasubramanian et al. | | |
| 5,664,059 A * | 9/1997 | Zhao | | 704/254 |
| 5,679,001 A * | 10/1997 | Russell et al. | | 434/185 |
| 5,682,464 A * | 10/1997 | Sejnoha | | 704/238 |
| 5,930,749 A * | 7/1999 | Maes | | 704/228 |
| 6,092,072 A * | 7/2000 | Guha et al. | | 707/700 |
| 6,373,985 B1 * | 4/2002 | Hu et al. | | 382/229 |
| 6,404,925 B1 | 6/2002 | Foote | | |
| 6,405,168 B1 * | 6/2002 | Bayya et al. | | 704/256 |
| 6,542,869 B1 * | 4/2003 | Foote | | 704/500 |
| 6,560,360 B1 | 5/2003 | Neskovic | | |
| 6,570,991 B1 * | 5/2003 | Scheirer et al. | | 381/110 |
| 6,751,354 B2 | 6/2004 | Foote | | |
| 7,647,209 B2 * | 1/2010 | Sawada et al. | | 702/190 |
| 2001/0032075 A1 * | 10/2001 | Yamamoto | | 704/256 |
| 2003/0236661 A1 * | 12/2003 | Burges et al. | | 704/205 |
| 2004/0186733 A1 * | 9/2004 | Loomis et al. | | 704/278 |
| 2008/0215651 A1 * | 9/2008 | Sawada et al. | | 708/205 |
| 2009/0187376 A1 * | 7/2009 | Ogiwara et al. | | 702/158 |

* cited by examiner

Primary Examiner — Michael Colucci
(74) Attorney, Agent, or Firm — Creative Technoloty Ltd

(57) ABSTRACT

An input signal is converted to a feature-space representation. The feature-space representation is projected onto a discriminant subspace using a linear discriminant analysis transform to enhance the separation of feature clusters. Dynamic programming is used to find global changes to derive optimal cluster boundaries. The cluster boundaries are used to identify the segments of the audio signal.

17 Claims, 7 Drawing Sheets

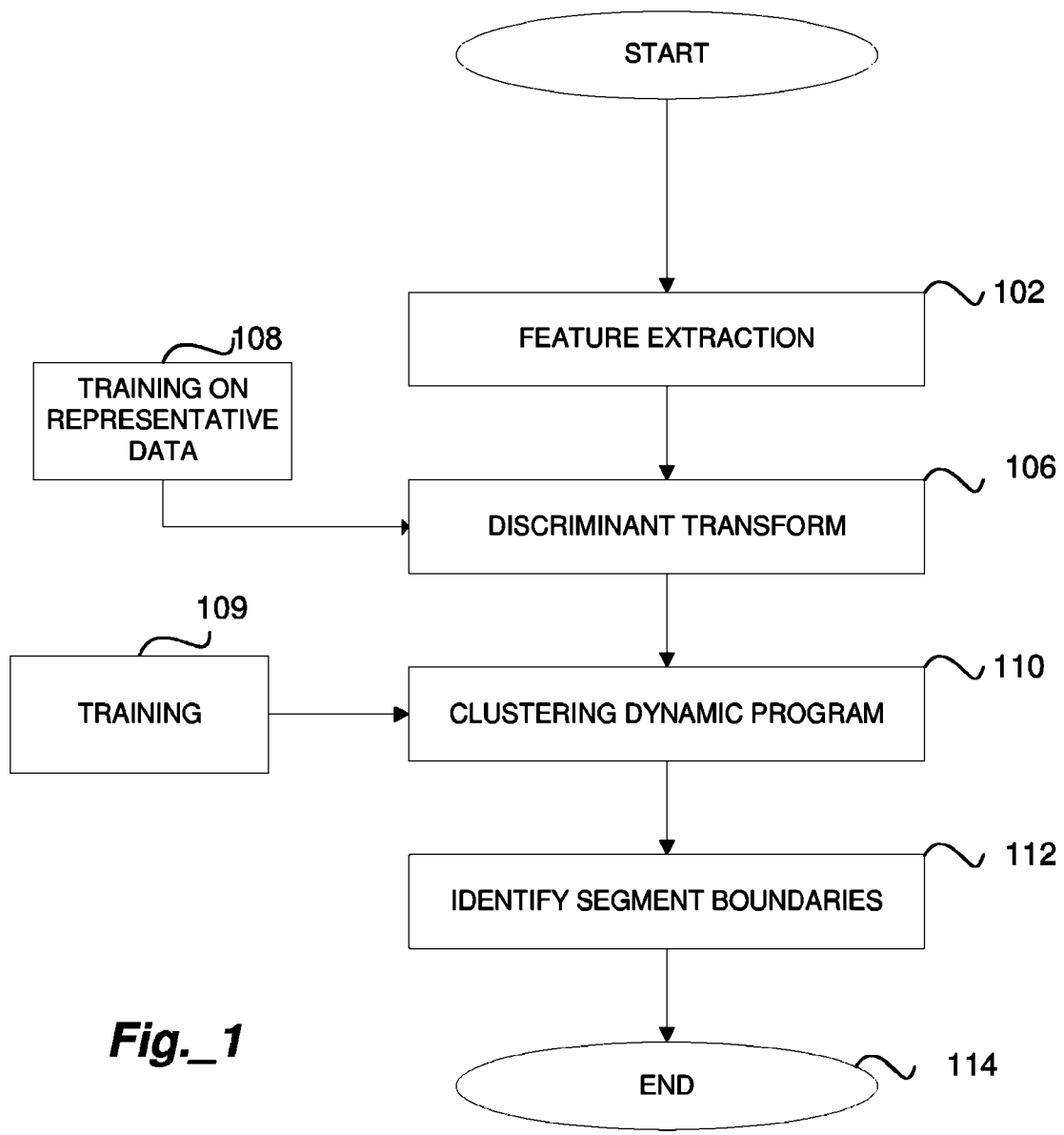
Fig._1

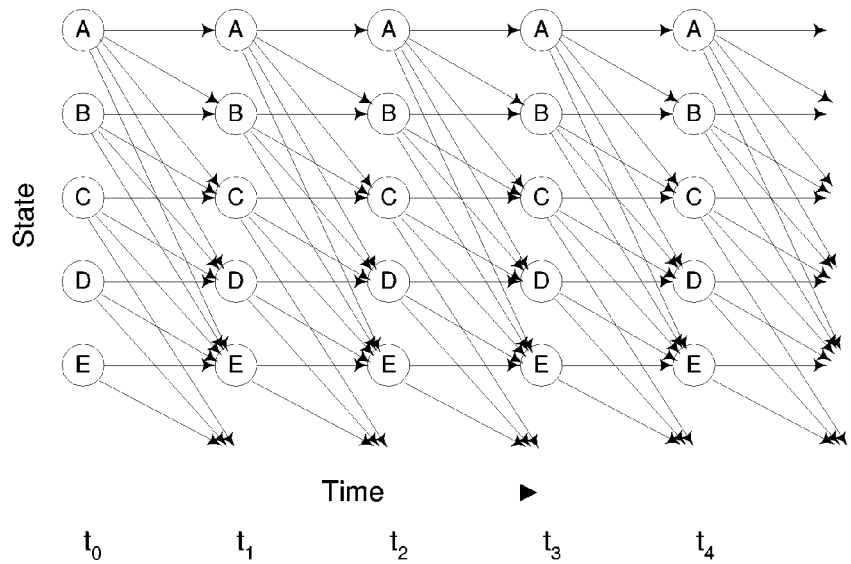
Fig._2B
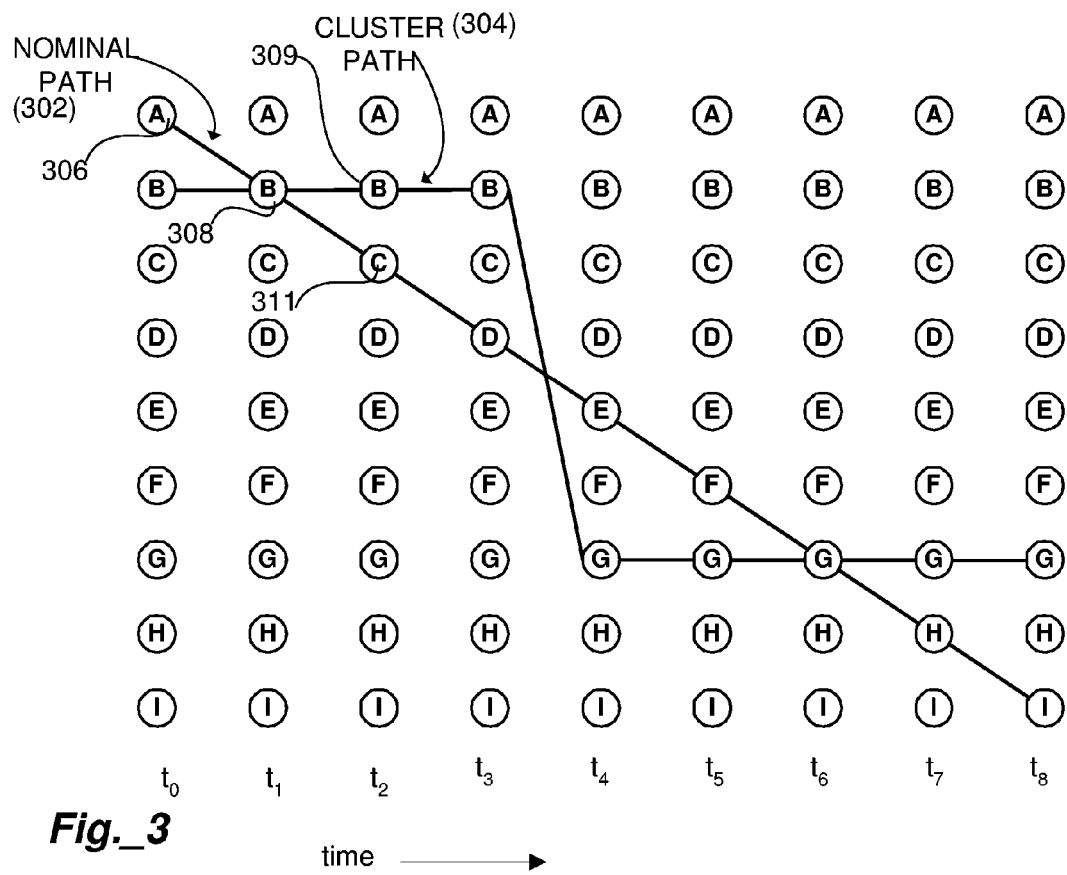
**Fig._3

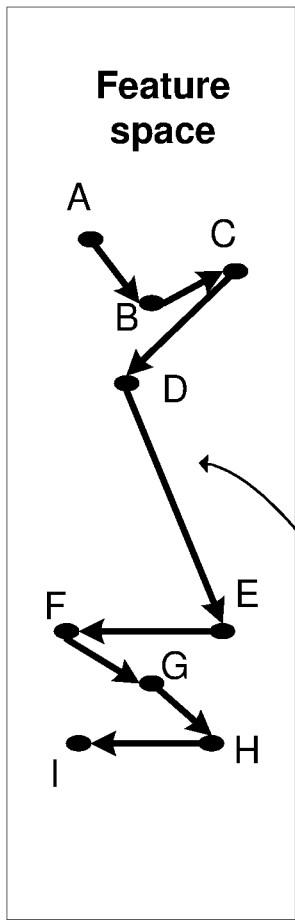 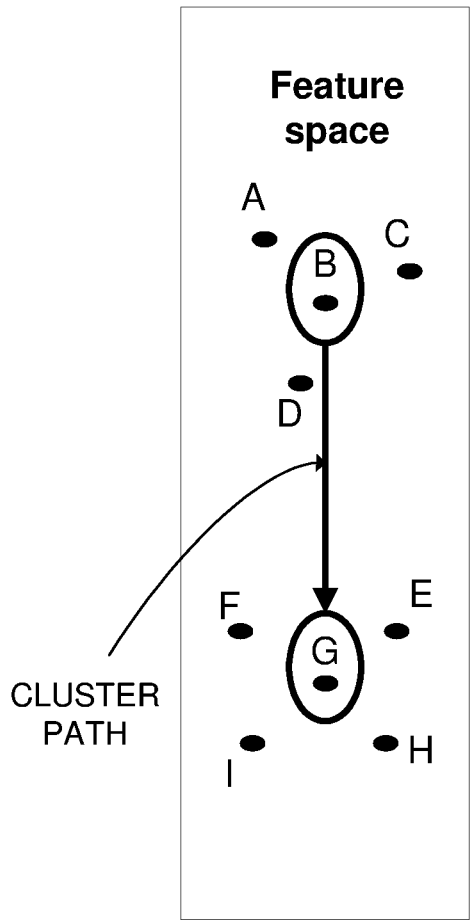
Fig._4A  Fig._4B

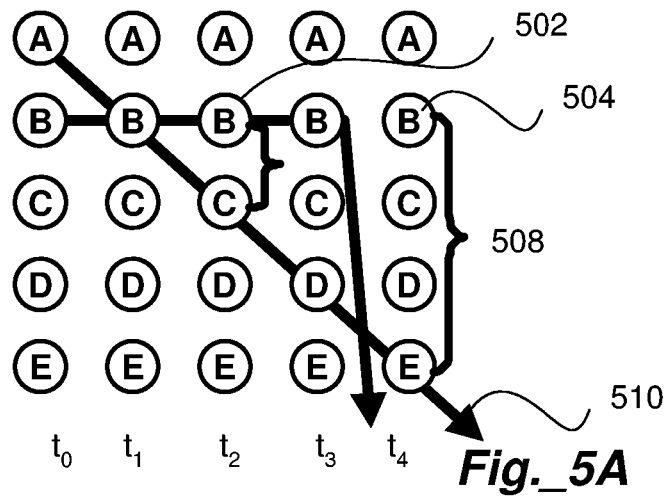
Fig. _5A
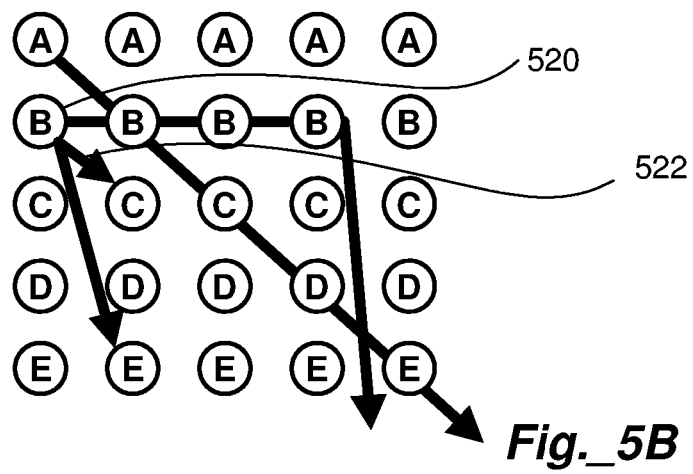
Fig. _5B
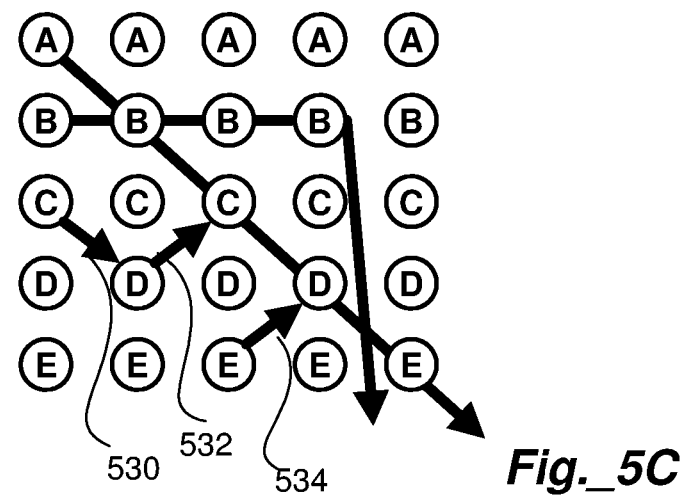
Fig. _5C

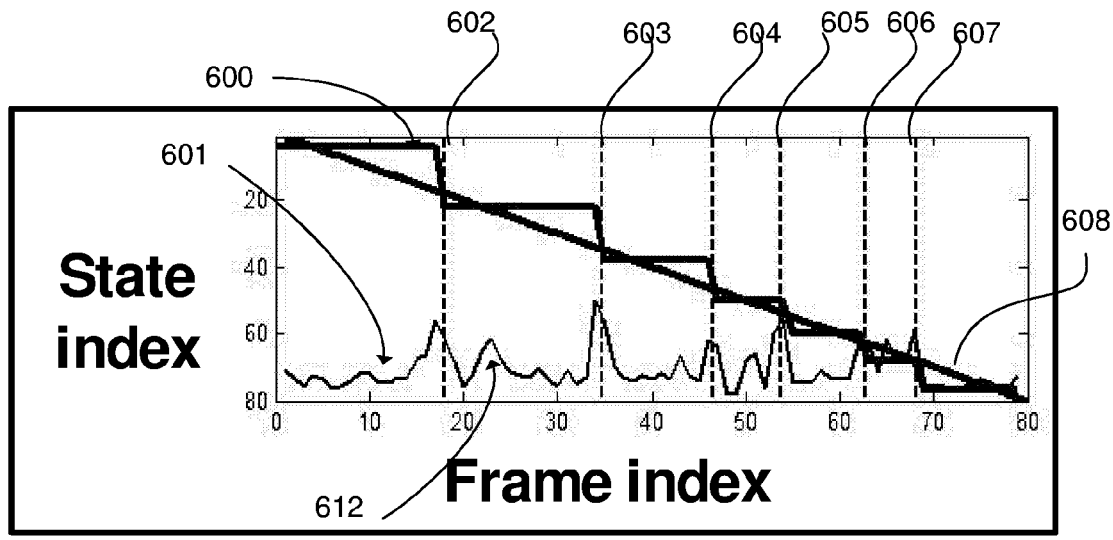
*Fig._6*
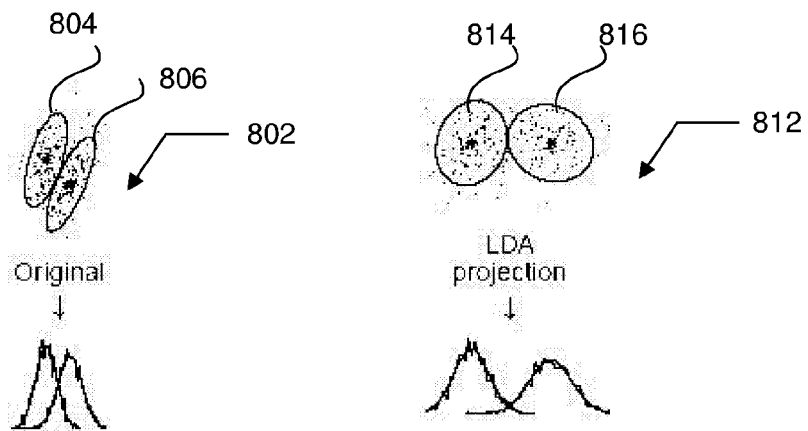
*Fig._8A*  *Fig._8B*

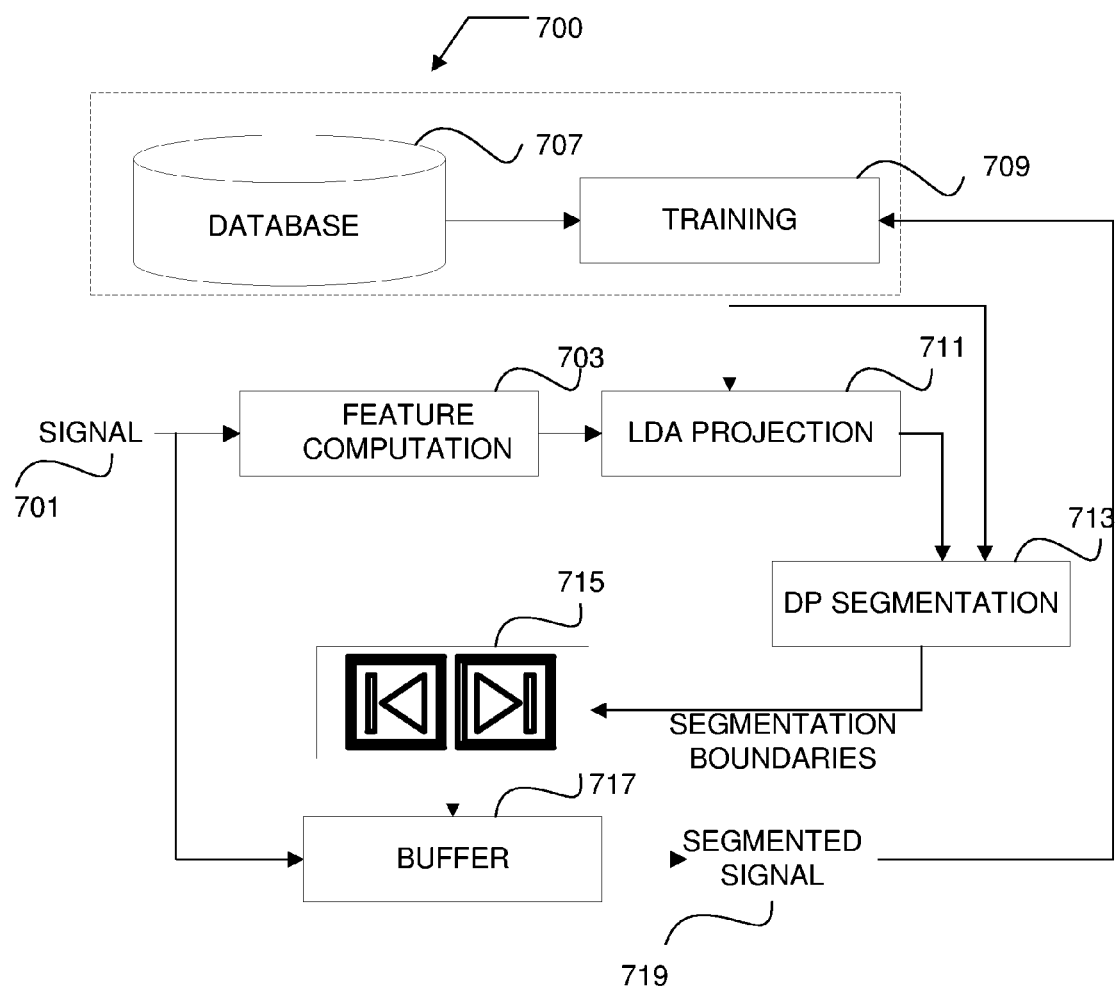
Fig._7

METHOD FOR SEGMENTING AUDIO SIGNALS

RELATED APPLICATIONS

This application claims the benefit of U.S. Provisional Application No. 60/620,211, filed on Oct. 18, 2004, the entire specification of which is incorporated herein by reference in its entirety.

FIELD OF THE INVENTION

The present invention relates to segmenting signals. More particularly, the present invention relates to segmenting an input signal into characteristic regions based on feature-set similarities.

BACKGROUND OF THE INVENTION

Segmentation of audio signals into meaningful regions is an essential aspect of many applications. For instance, segmentation plays an important role in speech/music discrimination for broadcast transcription, audio coding using transient detection and window switching, identification of suitable audio thumbnails, and demarcation of songs in continuous streams for database creation or smart transport. To perform effectively, such applications rely on a basic signal understanding provided by automatic segmentation. Segmentation approaches described in the literature generally represent the signal as a sequence of features in a meaningful feature space and then attempt to identify points of change in the feature sequence using statistical models or various distance metrics.

The distance metric approaches typically estimate segment boundaries by finding peaks in a novelty function. These are interpreted as points of change in the audio signal. However, the typical novelty functions tend to exhibit peaking within the actual segments as well as at the segment boundaries. Thus, these segmentation approaches based on novelty functions tend to lead to incorrect segment boundary determinations. It is therefore desirable to provide an improved signal segmentation method that is less prone to incorrect identification of segment boundaries.

SUMMARY OF THE INVENTION

The present invention provides a method for segmenting an audio signal into a plurality of segments. An audio input signal is mapped to a feature-space signal. The feature-space signal includes a plurality of feature vectors. The plurality of segments are identified by applying dynamic programming to the feature vectors.

In order to segment incoming signals into meaningful regions, embodiments of the present invention initially convert the signal into a feature-space sequence of feature vectors. In particular, the incoming signal is decomposed into the sequence of feature vectors using a sliding window analysis. For each time frame, a separate feature vector is generated. The feature-space representation of the signal is conditioned, i.e., projected onto a new axis or subspace that enables better discrimination between groups (clusters) of feature vectors. Preferably, the conditioning is performed using linear discriminant analysis (LDA). More preferably, the LDA transformation is customized from a "training set" of known data and clusters which are representative of the audio signals to be segmented. The conditioned feature-space vectors are processed using a dynamic program (DP) using local, transition, and bias costs to determine the best path between states corresponding to the feature vectors.

In accordance with one embodiment, a method of segmenting an audio or video input signal or image signal into a plurality of segments is provided. A feature-space sequence of feature vectors is derived from the input signal. The feature-space signal is conditioned by applying a discriminant transform to the sequence of feature vectors to project the feature vectors onto at least one new axis or subspace to aid in discriminating between clusters of feature vectors. A dynamic program is applied to the conditioned feature-space vectors to identify boundaries between clusters and the cluster boundaries are used to indicate the segment boundaries.

In accordance with another embodiment, the dynamic program is applied to the sequence of feature space vectors. According to one aspect, the dynamic program uses a local cost based on a Euclidian distance between at least a plurality of feature vectors in the sequence. According to another aspect, the dynamic program uses a local cost based on a weighted distance between at least a plurality of feature vectors in the sequence. According to another aspect, the dynamic program uses a transitional cost based on an inverse of a weighted distance between at least a plurality of feature vectors in the sequence. According to yet another aspect, the dynamic program uses a transitional cost based on an inverse of a Euclidian distance between at least a plurality of feature vectors in the sequence.

In accordance with another embodiment, the dynamic program is applied to the sequence of feature space vectors and determines a characteristic feature set for a group of feature vectors and transitions to a new characteristic feature set when the first characteristic set is no longer representative of the nominal features. The method uses a local cost corresponds to the Euclidian distance between at least a plurality of feature vectors in the sequence and a transition cost corresponding to an inverse of the Euclidian distance.

In accordance with yet another embodiment, the dynamic program is applied to the sequence of feature space vectors using a local cost corresponding to the weighted distance between at least a plurality of feature vectors in the sequence and a transition cost corresponding to an inverse of the weighted distance between a plurality of feature vectors.

In accordance with another embodiment, a segmentation device for segmenting a media signal into a plurality of segments includes a memory buffer configured to receive the media signal and a processor. The processor is configured to receive the media signal and to derive a feature-space sequence of feature vectors from the media signal and to apply dynamic program techniques to the sequence of feature vectors to identify clusters of feature vectors and boundaries between clusters corresponding to segment boundaries.

In accordance with a further embodiment, the processor is configured to utilize the identified segmentation boundaries as either navigation indices into the signal or to modify the input signal stored in the buffer such that segments of the media signal are identified. The processor is further configured to condition the feature-space sequence by applying a discriminant transform to the sequence of feature vectors to project the feature vectors onto at least one new axis to enhance separation between clusters of feature vectors.

These and other features and advantages of the present invention are described below with reference to the drawings.

BRIEF DESCRIPTION OF THE DRAWINGS

FIG. 1 is a flowchart illustrating steps in the determination of segment boundaries in accordance with one embodiment of the present invention.

FIG. 2B is a state transition diagram illustrating a dynamic program in accordance with a second embodiment of the present invention.

FIG. 3 is a partial state transition diagram illustrating operation of the dynamic program for feature-space clustering in accordance with one embodiment of the present invention.

FIGS. 4A and 4B respectively illustrate examples of a nominal path and a cluster path in feature space in accordance with one embodiment of the present invention.

FIGS. 5A-5C are partial state transition diagrams illustrating cost functions for dynamic programming in accordance with one embodiment of the present invention.

FIG. 6 depicts a cluster path derived by a dynamic program in accordance with one embodiment of the present invention.

FIG. 7 is a diagram of a system structure 700 for segmenting a signal in accordance with one embodiment of the present invention.

FIG. 8A is a graphical depiction of two classes of raw features.

FIG. 8B is a graphical depiction of two classes of features after an LDA transformation in accordance with one embodiment of the present invention.

DETAILED DESCRIPTION OF PREFERRED EMBODIMENTS

Figure 2A:
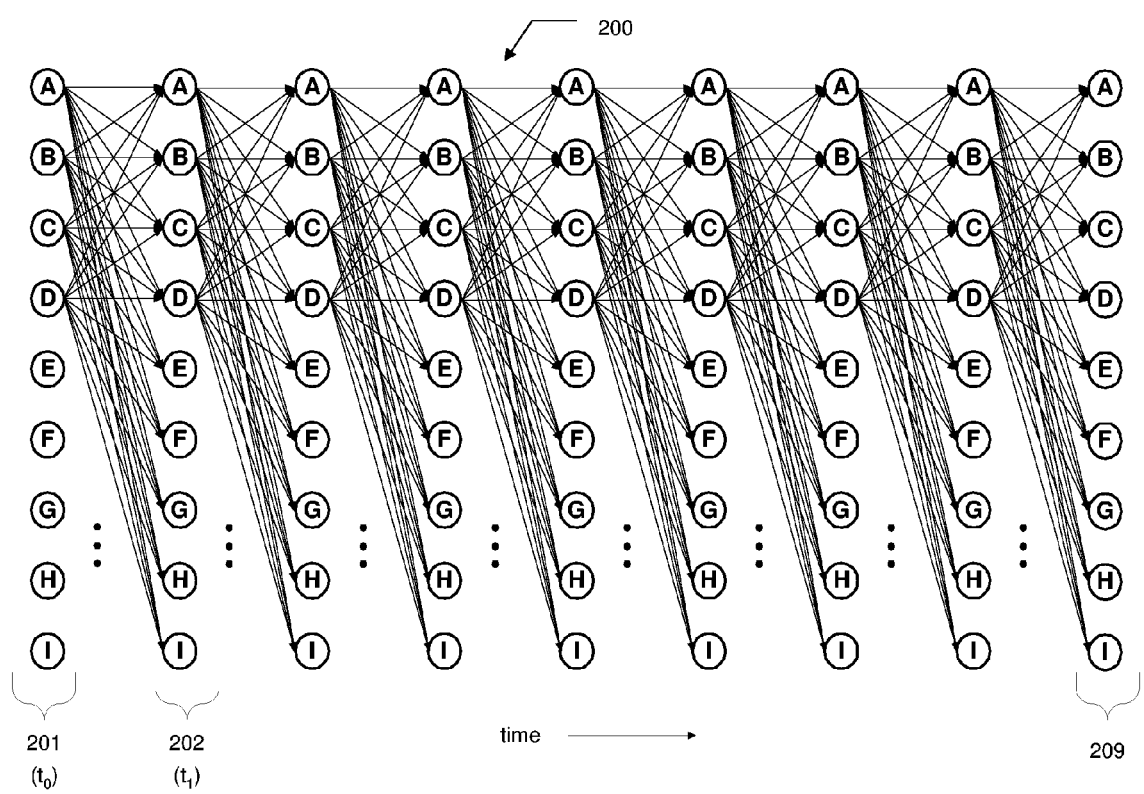
FIG. 2A is a state transition diagram illustrating a dynamic program in accordance with one embodiment of the present invention.

Reference will now be made in detail to preferred embodiments of the invention. Examples of the preferred embodiments are illustrated in the accompanying drawings. While the invention will be described in conjunction with these preferred embodiments, it will be understood that it is not intended to limit the invention to such preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known mechanisms have not been described in detail in order not to unnecessarily obscure the present invention.

It should be noted herein that throughout the various drawings like numerals refer to like parts. The various drawings illustrated and described herein are used to illustrate various features of the invention. To the extent that a particular feature is illustrated in one drawing and not another, except where otherwise indicated or where the structure inherently prohibits incorporation of the feature, it is to be understood that those features may be adapted to be included in the embodiments represented in the other figures, as if they were fully illustrated in those figures. Unless otherwise indicated, the drawings are not necessarily to scale. Any dimensions provided on the drawings are not intended to be limiting as to the scope of the invention but merely illustrative.

In order to segment incoming signals into meaningful regions, embodiments of the present invention initially convert the signal into a feature-space representation. In particular, the incoming signal is decomposed into a sequence of feature vectors in feature space using a sliding window analysis. For each time frame, a separate feature vector is generated. According to a preferred embodiment, the feature-space representation of the signal is conditioned, i.e., projected onto a new axis or subspace that enables better discrimination between groups (clusters) of feature vectors. Preferably, the conditioning is performed using linear discriminant analysis (LDA). More preferably, the LDA transformation is customized from a representative "training set" of known data and clusters. That is, the training set is representative of the expected but as yet unknown data.

In one embodiment, the linear discriminant analysis is used to transform new raw data into a new, more useful, feature space. In so doing, the separation between clusters is maximized while the variance within a cluster is minimized, thus suppressing spurious peaks in novelty functions based on the feature-space distance between sequential samples. Next, global trends in the sequence of feature vectors are identified using dynamic programming techniques by focusing on "means" of subsequences and identifying boundaries when the samples considered in sequence start to aggregate around a new mean. Once the segment boundaries are identified in feature space, a simple computation is performed to identify the segment boundaries in the time domain. For example, each column in the DP trellis corresponds to a time frame. Using information as to the length of the time frame, a feature-space cluster boundary may be related to a time-domain segmentation point.

FIG. 1 is a flowchart illustrating steps in identifying segment boundaries in accordance with one embodiment of the present invention. An audio signal or other input signal is preferably represented in a feature space by carrying out a sliding-window analysis to extract feature sets on a frame-to-frame basis. Thus, as illustrated in operation 102, a sliding window is applied sequentially to extract the signal features. Each window hop yields a new set of features unique to that portion of the signal under examination. For example, for the i-th frame:

$$w[n]x[n+iL] \rightarrow \text{feature analysis} \rightarrow f_i \qquad (1)$$

where w[n] represents the sliding window and x[n+iL] represents the time domain function and $f_i$ represents the feature vector. Some examples of features relevant to audio segmentation include zero-crossing rate, subband energies, spectral envelope, spectral centroid (the "center of mass" of the spectrum), spectral tilt (the slope of the spectral envelope), spectral flux (the rate of change of the spectrum), and RMS energy. Similar features are used in music information retrieval, audio fingerprinting, and other content-based applications. Embodiments of the present invention use these or any of a wide selection of features known to those of skill in the relevant arts in performing the segmentation. Because the methods described in embodiments of the present invention use a discriminant transformation to cull out features that are not relevant to the proposed discrimination and segmentation scheme, any features may be included at this stage. These described features are intended to be illustrative and not limiting as to the scope of the present invention. It is expected that one of skill in the art could identify a suitable set of features for any input signal, including image or video signals, and using the guidance provided herein apply a discriminant transform appropriately to help derive clusters.

The selection of features is a key aspect in the performance of conventional segmentation systems. For instance, if the feature set used in fingerprinting does not exhibit sufficient differences for different songs, the fingerprinting will not perform robustly. Preferably, embodiments of the present invention incorporate a wide array of features and apply prior training to the discriminant transform to weight those features appropriately for the selected signal for segmentation. Thus, by incorporating a wide variety of features and using different weightings to filter the features, the discriminant transform mitigates the criticality of the initial feature selection.

The output of the feature extraction block 102 is the feature vector $f_i$. The sequence of feature vectors $f_i$ provides a feature-space representation of the input signal. From this representation a variety of similarity (or dissimilarity) metrics can be directly computed for successive feature vectors; prior methods use such metrics as novelty functions to estimate segmentation boundaries. Although certain embodiments of the present invention apply clustering techniques to raw feature-space data, improved segmentation results are obtained in embodiments performing conditioning on the feature-space vectors.

According to a preferred embodiment, a discriminant transform is applied to condition the feature space, as illustrated in operation 106 of the flowchart illustrated in FIG. 1. Most preferably, the discriminant transform is a linear discriminant analysis (LDA) customized for the input signal by a using a training set of data representative of the desired clusters in operation 108. For example, in one embodiment, where the input signal is an audio signal, a suitable representative training set comprises a sampling of speech-only signals and music-only signals to perform both speech and music differentiation and song boundary identification. In accordance with another embodiment, the input signal is an audio signal and the representative training set comprises a sampling of music-only signals for determining the segment boundaries between songs.

The discriminant transform assists in segregating the feature vectors into clusters. The particular discriminant transform operates to project the feature-space representation of the input signal onto a new axis or feature space that is better capable of discriminating between clusters of feature vectors. For example, FIG. 8 illustrates the clustering improvement that can be obtained from using discriminant transforms such as the LDA. In FIG. 8A the original representation in raw feature space 802 of two classes 804 and 806 is illustrated. By using an LDA projection onto discriminant subspace 812 as shown in FIG. 8B, differentiation between classes 814 and 816 is made easier. That is, the conditioning spheres the data clusters and separates the cluster means.

Preferably, the LDA training determines the best linear combination of the features selected to separate the data classes while simultaneously projecting the data onto a subspace with dimensionality equal to one less than the number of training classes (or fewer). The LDA thus results in dimension reduction as well as automatic management of the relevance of the raw signal features.

Any of a variety of discriminant transforms may be applied, for example linear methods other than LDA or non-linear methods such as support vector machines (SVM). In fact, the scope of the invention is intended to extend to any transform that improves the cluster discrimination. In linear methods where the discriminant transform can be expressed as a matrix D, such that the conditioned features are given by a=Df, the similarity between a pair of feature vectors may be determined from the unweighted distance between the conditioned features $d_{ij}=(a_i-a_j)^H(a_i-a_j)$, or equivalently the weighted vector difference norm of the raw features $$d_{ij}=(f_i-f_j)^H D^H D(f_i-f_j) \quad (2)$$

where $D^H D$ is the identity matrix for the Euclidean distance, the inverse covariance matrix of the feature set for the Mahalanobis distance, or some other feature weighting specific to the particular discriminant transform. A linear discriminant transform thus corresponds to a distance measure which scales the various dimensions in the raw feature space. Without intending to limit the scope of the invention, it is believed that from those described herein, the LDA provides the best matrix D to transform or condition the raw features.

The sequence of differences between successive feature vectors is then an example of a novelty function which attempts to quantify the extent of change in the audio signal between adjacent frames. Feature-based segmentation schemes typically determine segment boundaries by finding peaks in the novelty function; these are taken to indicate points of change in the audio signal, i.e. there is a change if successive features $f_i$ and $f_{i+1}$ are deemed dissimilar enough. The conventional techniques assess whether successive frames are substantially dissimilar to indicate a segmentation boundary by applying a heuristic threshold. The key shortcoming of such methods is that the robustness or optimality of a given threshold cannot be guaranteed. Rather than using thresholding principles applied to novelty functions, embodiments of the present invention identify cluster boundaries using dynamic programming.

Returning to the flowchart of FIG. 1, once the feature space has been conditioned, dynamic programming is used in operation 110 to find cluster transitions. That is, after the feature vectors are extracted and optionally conditioned, global trends in the sequence of feature vectors are identified using dynamic programming techniques to identify cluster transitions. These cluster transitions in turn indicate the segment boundaries. The audio segmentation problem differs from standard clustering problems in that the clusters arrive sequentially. Thus, the structure and design of the dynamic program preferably takes into account the sequential nature of the feature clustering in the segmentation framework when attempting to segment audio or similar sequential signals. Further, the cost functions for the DP are selected such that transitions between successive clusters are more readily identified.

According to one optional embodiment, training 109 may be applied to the dynamic program to determine the optimal weighting of any local, transition, or bias costs used in the DP. Alternatively, the training may be used to determine the functions used for these costs. Those of skill in the relevant arts are familiar with selection of suitable training sets and adapting the results obtained from the use of the training sets to provide suitable configurations for the dynamic programming. Hence, complete details will not be provided here.

Next, as illustrated in stage 112, the segment boundaries are identified. In order to identify segment boundaries, the times corresponding to the cluster transitions identified in feature space are matched with segment boundaries in the incoming signal. In one embodiment, a "smart transport" system is implemented. That is, navigation in a forward or backward direction through a buffered signal may take place based on meaningful segment boundaries instead of arbitrary time durations. For example, the incoming signal may be stored in a buffer and stored segment times used in the navigation procedure. In an alternative embodiment, metadata is inserted into the signal to indicate segment boundaries. Techniques as to bookmarking or indexing signals with identifiers or other metadata are known to those of skill in the relevant arts and thus complete details will not be provided here. The method ends at step 114 after the segments are identified.

Further details as to the steps involved in using dynamic programming to determine the segment boundaries are provided below and illustrated in FIGS. 2-3. In each of these figures, the features extracted from the signal in sequence are A, B, C, . . . FIG. 2A is a partial state transition diagram illustrating implementation of the dynamic program for feature-space clustering in accordance with one embodiment of the present invention. As illustrated, each feature vector (i.e., feature vectors A through I) corresponds to states A through I at each time period, for example at time period 201 ($t_0$). Each column (i.e., columns 201, 202, . . . 209) includes candidate states for the corresponding time index. Thus, the state transition diagram 200 is used in the dynamic programming algorithm to identify the path having the lowest cost for traversing the sequential columns of candidate states. For example, at time 201 (i.e., as represented by the column of states A, B, C, . . . I at the designated time), in order to proceed from source vector (state) D, the path would proceed to one of the states represented by candidate target vectors A through I for the next time increment, that is, the time increment corresponding to and depicted by the time period corresponding to column 202 ($t_1$). The dynamic programming analysis is adapted to identify the path with the lowest cost by identifying for each time increment the costs of transitioning from each source vector (state) to each of the respective candidate target vectors (states) in the next time increment (and depicted by the next column of feature vectors). For the time periods under examination by the state transition diagram, the path preferably representing the lowest aggregate cost is selected.

This particular state transition diagram permits the path to travel back to a state earlier in the nominal sequence. Such flexibility may be desirable in some instances based on the nature of the signal, the types of features under evaluation, and the specific application. For example, searching for a chorus in a musical track will recognize a return to a previous state. However, in many instances, the sequential nature of the signal and the different characteristics of the features presented sequentially will discourage a return to states already recognized.

Accordingly, a state transition diagram illustrating a preferred embodiment is illustrated in FIG. 2B. The configuration of the state transition diagram illustrated in FIG. 2B provides improved computational efficiency by only permitting transitions to new states, i.e., states different from those already recognized. Assuming there are N feature sets in the sequence, an N×N state machine such as that in FIG. 2B is constructed. For each time frame j, there are N candidate states; letting i be the vertical state index and j the horizontal time frame axis, each state $S_{ij}$, as illustrated in the figure, is associated with a corresponding feature vector. Hence, in order to identify the path having the lowest aggregate cost, the costs for travel from a source vector to candidate target vectors look only to the alternatives of remaining in the same state (vector) or transitioning to a state corresponding to a feature vector later in the nominal time sequence. Thus, for example, at time to, in order to progress from state B to a state at time $t_1$, only candidate target states B, C, D and E are evaluated. Transitioning back to state A at time $t_1$ is not considered as an option and hence there is no arrow graphically depicted for such a transition in the diagram. For most sequential signal segmenting applications, this configuration of the dynamic program is believed to be more efficient and more suitable than the embodiment illustrated in FIG. 2A.

FIG. 3 is a partial state transition diagram of the dynamic program for feature-space clustering illustrating a nominal feature path and a candidate cluster path in accordance with this embodiment of the present invention. The diagonal path 302 of the state transition diagram illustrated in FIG. 3 corresponds to the nominal feature-space trajectory of the signal. That is, at time $t_j$, the nominal path is in state $S_{jj}$, each of the states and time indices progressively increasing in value from the top left corner of the state transition diagram, the time index increasing with movement to the right and the state index increasing with downward movements. In specific, at the time $t_0$ the nominal path is in state $S_{00}$ represented by reference number 306. At time $t_1$, the nominal path is in reference state $S_{11}$ represented by reference number 308, and so on.

The dynamic programming algorithm is suited to find a path through the state diagram which optimizes some specified cost function. In accordance with one embodiment, the cost rules are specified such that a local cost is incurred for each state and a transition cost is incurred for jumps between states. Preferably, the dynamic program design optimally includes selected cost functions such that the resulting optimal path indicates a trajectory through clusters. This trajectory or cluster path will comprise a stepwise traversal of the state transition diagram. Each plateau corresponds to a cluster and each step is a transition between clusters. The feature vector corresponding to a cluster plateau provides the characteristic feature set for that cluster. The nominal feature path 302 and a candidate cluster path 304 are depicted in FIG. 3. More specifically, by implementing appropriate cost rules, the dynamic program examines the nominal local sequence of feature vectors, determines a characteristic feature set for a grouping of sequential feature vectors and then transitions to a new characteristic feature set when the first characteristic set is no longer a good representative of the nominal features. Each cluster found by the DP indicates a segment of the audio signal; in other words, the transitions in the cluster path correspond to segmentation boundaries. Thus, effective determination of segments can be achieved by judicious design of the DP cost functions.

The dynamic programming technique preferably finds a path through the state transition diagram by optimizing a specified cost function. The cost function is preferably composed of a local cost for each state as well as costs for transitions between states, although the invention is not so limited. Denoting a path through the DP as p[j] and the nominal path as n[j]=$S_{ij}$, in accordance with one embodiment, the optimal path r[j] is expressed as $$r[j] = \arg\min_{p[j]} \sum_j \alpha L(p[j], n[j]) + \beta T(p[j], p[j-1]) \quad (3)$$

$$r[j] = \arg\min_{p[j]} \sum_j \alpha C_L(p[j]) + \beta C_T(p[j]) \quad (4)$$

where L and T are the local and transition cost functions, α and β are relative weights for the costs, and $C_L$ and $C_T$ are aggregate totals for the components costs for a given path. Preferably the dynamic program design selects the cost functions L and T such that the resulting optimal path indicates a trajectory through clusters that are representative of the nominal feature-space trajectory. That is, the resulting optimal path approximates the nominal path.

The local cost in a preferred embodiment reflects how reasonable it is to be in state i at time j, where i is the vertical state index and j refers to the time frame in the sequence. From FIG. 3 it can be seen that the final trajectory (of the cluster path 304) is composed of horizontal segments separated by transitions. In any horizontal segment of this desired cluster path, we remain in the same state. The costs are configured, for example, such that to remain in state $i_0$, the local cost of state $i_0$ at time j ($S_{i_0 j}$) should be small if the feature vector measured in the signal at time j (the one associated with the nominal state $S_{jj}$) is similar to the feature vector associated with state $i_0$, and high otherwise. For example, to remain in state B from time $t_1$ to time $t_2$ as represented by reference numerals 308 and 309 respectively, the feature vector for the nominal diagonal state 311 (the nominal feature vector for that time $t_2$ in the sequence) should be similar to the feature vector associated with state B (the feature vector characteristic of the cluster). This ensures that along a horizontal segment the successive feature vectors extracted from the signal are similar to the feature vector B that represents that segment.

FIGS. 4A and 4B respectively illustrate examples of a nominal path and a cluster path in feature space in accordance with one embodiment of the present invention. As illustrated in FIG. 4A, the nominal path follows the sequence of feature vectors from A to I, i.e., A, B, C, D, . . . I. FIG. 4B illustrates graphically the fundamentals of the segmentation scheme. State B, corresponding to feature vector B, is representative of the feature vectors A, B, C, and D, thus feature vector B can be described as the characteristic feature vector for the first group or cluster. Similarly, feature vector G is representative of the feature vectors E, F, G, H, and I and thus feature vector G is defined as the characteristic feature vector for the second cluster. The transition from state B to state G is illustrated by cluster path 304 in FIG. 3. The transition occurs at time $t_4$. No transition occurs at time $t_3$ due in part to the similarity between feature vector D (designated as the nominal state for time $t_3$ as denoted by nominal path 302) and feature vector B, the characteristic feature vector for the current state B. One measure of the similarity of feature vectors B and D is their close proximity as further illustrated in FIG. 4. Stated differently, the local cost of state B at time $t_3$ as measured by the distance metric is low.

Recalling the state transition diagram of FIG. 2B and applying the feature vector notation used therein, a good choice for the local cost function is the Euclidean distance between feature vectors or some weighted distance $(a_i-a_j)^H \phi (ai-aj)$ so that the cost of being in state $S_{ij}$ (i.e., the local cost) is the distance between the feature vectors of that state and of the nominal diagonal state $S_{jj}$ for that time index.

The dynamic program (DP) preferably optimizes cost functions over all possible paths. Preferably, the costs evaluated include more than just a local cost, a cost for being in a particular state. More preferably, the DP evaluates in addition a transition cost, i.e., the cost for changing states. Most preferably, the DP evaluates a local cost, transitional cost, and a DP bias cost, i.e., a fixed cost for state jumps. In this embodiment, the cluster path is determined from a weighted sum of local cost, transition cost, and bias cost functions. With suitably customized costs for the particular application, the cluster path determined from the DP analysis will transition only at appropriate cluster boundaries corresponding to meaningful points of change in the audio or other input signal.

Further details as to design costs are set forth below with reference to the diagrams illustrated in FIG. 5. These details generally relate to the feature space of feature vectors illustrated in FIGS. 4A-4B. As illustrated in FIG. 5A, the local or state cost is a measure of the (dis)similarity between the candidate state and the nominal state. The local cost adds a penalty (i.e., a higher cost) for being in a state wherein the corresponding feature vector is far in feature space from the nominal state feature vector for that time period. One measure for the local cost in one embodiment is the weighted distance from the feature vector of the candidate state to the feature vector of the nominal state. For example, the local cost for remaining in state B (see reference number 502) at time $t_2$ corresponds to the distance in feature space between state B's feature vector and state C's feature vector (See FIG. 4). Further, at time $t_4$, the local cost for remaining in state B (see reference number 504) corresponds to the feature-space distance between feature vectors B and E, graphically depicted in the state transition diagram by bracket 508. The local cost helps find the best representative within a cluster. Using this cost measure, the nominal path 510 has a zero local cost. The local cost helps keep the optimal DP path close to the nominal path.

FIG. 5B illustrates determination of a transition cost in accordance with one embodiment. The transition cost preferably imposes a high cost for transitioning between states with similar feature vectors but a low cost for transitioning between dissimilar states and zero cost for no transition (i.e., remaining in the same vertical state from one time index to the next). Thus, it favors jumps between dissimilar states. These may be represented in feature space by vectors spaced far from each other. According to one embodiment, the transition cost is determined as a function of the inverse of the weighted distance between the feature vectors corresponding to the source and the respective candidate (target) state. Generally, minimizing the transition costs leads to clustering by encouraging remaining at the cluster means and transitioning only between clusters. In particular, the transition cost helps prevent transitions between samples in the same cluster. Thus, the transition cost when properly designed will discourage transitions from state B to states corresponding to nearby feature vectors and encourage transitions to dissimilar states (i.e., those having feature vectors farther away). Thus the transition 522 from state B to state C is discouraged while the transition 523 from state B to a dissimilar state such as state E (or G) is encouraged.

A bias cost or fixed cost is used in one embodiment to further optimize determination of segment boundaries. For example, exemplary bias costs include fixed costs for certain state jumps. These can be determined from the nominal time indices of the source and target states. In this way, application-specific rules can be imposed, such as disallowing backward jumps. FIG. 5C illustrates determination of a bias costs in accordance with one embodiment. Backwards jumps such as transitions 532 and 534 can thus be discouraged or prohibited by the design of this cost factor. Further, by suitable specification of this cost, jumps to states corresponding to feature vectors nearby in the feature vector sequence (such as the transition 530 from state C to state D) can be avoided in favor of jumps to states corresponding to vectors more distant in the time sequence. Thus, intra-cluster jumps may be discouraged through the judicious use of bias costs. Bias costs can thus be used to help establish a cluster size. Namely, the bias cost can be used to make the DP cluster path progress in large steps.

Returning to the determination of local costs, the aggregate local cost for a candidate path is the sum of the local costs for the states in the path. For the Euclidean or any similar distance measure, this is clearly zero for the nominal diagonal path. Assuming for the moment, however, that the transition cost is infinite such that a horizontal path must be chosen, if the weighted distance is adopted as the local cost metric, minimizing the total cost results in a horizontal path characterized by an appropriate representative feature vector as set forth below. Considering a set of N feature vectors and letting $a_m$ be the single feature vector of the chosen horizontal path, the aggregate local cost for the path is $$C_L = \sum_{j=0}^{N-1} L(a_m, a_j) = \sum_{j=0}^{N-1} (a_m - a_j)^H \Phi (a_m - a_j) \quad (5)$$

$$C_L = \sum_{j=0}^{N-1} (a_m - \bar{a} + \bar{a} - a_j)^H \Phi (a_m - \bar{a} + \bar{a} - a_j) \quad (6)$$

$$= N(a_m - \bar{a})^H \Phi (a_m - \bar{a}) + \sum_{j=0}^{N-1} (a_j - \bar{a})^H \Phi (a_j - \bar{a}) \quad (7)$$

where the cross-terms in the expansion of Eq. (6) cancel since $\bar{a}$ is the set mean. Eq. (7) indicates that the aggregate local cost is minimized if $a_m$ is the mean of the set; $a_m$ must however be chosen from the sample set. To find the best choice for $a_m$, we note that the second term in Eq. (7) is not dependent on $a_m$. We can then see from the first term that the optimal choice $a_m$ is the set member closest to the set mean $\bar{a}$. Thus, the optimal horizontal path is the path which stays in the state whose feature vector is closest to the mean of the set. In the clustering framework, this feature is the closest member of the cluster to the cluster mean and is the optimal choice to be a representative of the cluster.

In general, the transition cost can be formulated by considering several constraints. First, a high cost should be associated to switching from state i to state j if the corresponding feature vectors are similar; however, there should be zero cost for a transition from i to i (since we are looking for horizontal paths). Conversely, the cost should be small for a transition between very dissimilar feature vectors (so real transitions in the input signal are not missed). One preferred choice for the transition cost between two states is then the inverse of the Euclidian or some weighted distance between the corresponding feature vectors; a bias cost such as a constant cost can also be added for any non-horizontal transition to further favor clustering into horizontal segments. Examples of the inverse of either the Euclidian distance or the weighted distance include additive inverses and multiplicative inverses.

As an aside, if we consider the two-cluster case where a path with one transition is desired instead of a strictly horizontal path, we find that the transition cost between the two cluster means should be upper-bounded so that it would be outweighed by the local cost of just staying in a horizontal path:

$$T(m_0, m_1) < \frac{N_0}{2}(m_0 - m_1)^H \Phi(m_0 - m_1) \quad (8)$$

where $N_0$ is the cluster size and $m_0$ and $m_1$ are the cluster means. Some prior knowledge about the structure of the data clusters (such as the size and mean spacing) can thus be helpful in scaling the transition cost appropriately. As described above, in one embodiment a transition bias cost is incorporated which depends not on the source and target state feature vectors but rather on their vertical state indices, namely their nominal time indices in the feature vector sequence. For the segmentation task as described, only horizontal or downward transitions are allowed in the DP; for some signal analysis applications, though, it could be useful to include upward transitions in the state diagram and then apply a bias cost to either encourage or discourage revisiting past clusters, as further illustrated in FIGS. 2A and 2B.

As discussed above with reference to FIG. 5C, by suitably specifying the bias costs and according to an alternative embodiment, a lower bound may be imposed on the size of identified clusters by discouraging or disallowing jumps to indices nearby in the nominal time sequence.

If these local and transition cost functions are used in the DP, the LDA-DP segmentation algorithm identifies meaningful segment boundaries. Either Euclidian distance $d_E$, or Mahalanobis distance $d_M$ may be used as distance metrics in the determination of any of the foregoing DP cost functions.

$$d_E[(x-y)^T(x-y)]^{1/2} \quad (9)$$

$$d_M = [(x-y)^T \Sigma^{-1}(x-y)]^{1/2} \quad (10)$$

These examples of distances are intended to be illustrative and not limiting as to the scope of the embodiments of the present invention. For example, the scope of the invention is intended to cover other metrics used in determining the cost function, such as but not limited to the "Lp norm".

FIG. 6 depicts a cluster path derived by a dynamic program in accordance with one embodiment of the present invention. The cluster path 600 is derived using the dynamic program and exhibits transitions that match the actual segment boundaries 602-607. For reference purposes, a nominal diagonal path 608 is shown along with a novelty function 601 determined by conventional means. As illustrated, peaks such as peak 612 within the novelty function that might be interpreted incorrectly as a segment boundary by conventional means do not result in identified segment boundaries when using the DP analysis. The results obtained used LDA trained on similar sounds for conditioning of the feature space. In further detail, the algorithm was implemented in the Matlab simulation environment and as a C/C++ program. The signal targeted for segmentation was constructed by selecting random excerpts from random clips drawn from the LDA training set. Due to the random truncations of the LDA training set members, the segmentation algorithm was only acting on "similar" sounds to the training data, not exact training data. In general, it is preferred to train the LDA on data that is similar to the expected data. Even though in general the prior information may be more limited than used in this example, the performance of the segmentation algorithm performs well even where the prior information is limited or nonexistent.

FIG. 7 is a diagram of a system structure 700 for segmenting a signal in accordance with embodiments of the present invention. The input signal 701 is processed by conventional methods as described above to extract suitable features in the feature computation module 703. The clustering of feature sets is preferably improved in an LDA projection module 711 using a discriminant transform, such as linear discriminant analysis, to project the feature set onto a discriminant subspace or axis as described above. In order to optimize the segmentation for a given feature set, a training set is provided in one embodiment to optimize the discrimination. For example, a representative training set of examples may be stored in database 707 and subjected to training 709 to increase the effective performance of the LDA projection module 711. In particular, the feature-space clustering will be improved if the training set is appropriate for the signal in question. As long as similar perceptual discrimination applies between the examples in the training set and the signal 701, effective performance of the LDA can be expected. For example, in order to segment speech and audio, the LDA is preferably trained with general non-speech audio signals and pure speech signals as two classes to discriminate. It is expected that those of skill in the art and familiar with LDA, using the guidelines provided herein, and presented with a particular segmentation problem will be able to select appropriate and representative sets for use in training the LDA.

Next, a DP segmentation module 713 is used to derive optimal cluster boundaries. Preferably, the DP segmentation module 713 includes cost functions suitably designed as described above to find the DP path that transitions only at cluster boundaries. The DP segmentation preferably provides a weighted sum of local cost, transition cost, and bias cost to optimize the cost function and identify the DP path.

Once the segment boundaries are identified in feature space by the DP segmentation module 713, the corresponding times are computed and transmitted to a transport module 715. This module is designed in one embodiment to provide metadata information for insertion into the original signal 701 such as bookmarks to identify the segment boundaries. For example, the transport module 715 may work with a buffer 717 wherein the original input signal 701 is temporarily stored. After insertion of the bookmark or other metadata information identifying the segment boundaries, a segmented signal 719 is provided. According to an alternate preferred embodiment, module 715 stores the segment boundary times and uses those to enable "smart transport", i.e. navigating forward or backward through the buffered signal based on the meaningful segment boundaries, instead of the arbitrary time durations (such as 30 sec) currently used, for example, in digital video recorder systems. In this embodiment, the module 715 does not insert metadata indices or bookmarks into the signal; instead it places contextual intelligence into the forward and reverse buttons illustrated so that the user can skip through the buffered audio based on detected transitions in the signal.

According to one embodiment, the segmented signal 719 is used to provide a feedback function to the training module. That is, if the results of the discriminant transform are unsatisfactory, the transformation as derived from the training module 709 is modified. Using this modified training set, the effectiveness of the LDA discriminant transform as performed in LDA projection module 711 may be improved.

The various modules described herein may be implemented in a variety of circuit configurations. For example, the functions performed in the various modules may be implemented in a general purpose computer configured with code to perform the steps described. Alternatively, the functions may be implemented in dedicated ASICs (application specific integrated circuits), field programmable gate arrays (FPGAs), with discrete components including separate processors and memory modules integrated on one or more printed circuit boards, or using any other logic implementation circuits known to those of skill in the relevant arts. The scope of the invention is not to be limited to the cited examples but to extend to all configurations configured to perform the described functions.

By generating a feature-space representation of a signal, improving clustering of feature sets using a discriminant transform such as LDA, and applying a dynamic program to optimize the identification of cluster boundaries, an effective method for segmenting an audio input signal is provided. This method identifies general feature trends and avoids misidentification of cluster boundaries resulting from the presence of cluster outliers. The foregoing description describes several embodiments of a method for segmenting an input digital stream. While the embodiments describe details of audio content sources, the invention is not so limited but is intended to extend to media signals and non-media signals alike. Accordingly, the scope of the invention is intended to extend to methods for segmenting any types of input streams, including but not limited to video files, still images, and electrocardiogram (ECG) and other medical diagnostic signals. For example, the approach can be tailored to segment still images by interpreting pixels or regions of the image as elements in a data "stream". By configuring a device in accordance with the method steps described, a device configured to segment input streams may be provided.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of segmenting an input signal into a plurality of segments with a segmentation device, the method comprising:

deriving a feature-space sequence of feature vectors from the input signal;

conditioning the feature-space by applying a discriminant transform to the sequence of feature vectors such that separation between clusters of feature vectors is maximized while variance within a cluster is minimized, thereby suppressing spurious peaks in novelty functions based on feature-space distances between sequential samples; and applying a dynamic program to the sequence of feature vectors to identify clusters of feature vectors and boundaries between the clusters, wherein the boundaries between the clusters indicate the segment boundaries, wherein the discriminant transform conditions the feature-space based on a training set of representative data; and wherein the input signal is an audio signal and the training set of representative data comprises a sampling of music-only signals for determining boundaries between songs, the song boundaries corresponding to the segment boundaries.

2. The method as recited in claim 1 wherein the representative training set further comprises a sampling of speech-only signals in addition to the music-only signals to perform both speech and music differentiation, the speech and music differentiation corresponding to the segment boundaries.

3. The method as recited in claim 1 wherein the dynamic program includes local costs and transition costs used in determining an optimal state path.

4. The method as recited in claim 1 wherein the dynamic program includes a combination of each of local costs, transitional costs, and bias costs in determining an optimal state path.

5. The method as recited in claim 4 wherein segment boundaries are indicated by the optimal state path determined by the dynamic program.

6. The method as recited in claim 4 wherein the local cost corresponds to a Euclidian distance between at least a plurality of feature vectors in the sequences.

7. The method as recited in claim 4 wherein the local cost corresponds to a weighted distance between at least a plurality of feature vectors in the sequences.

8. The method as recited in claim 4 wherein the transition cost corresponds to an inverse of a Euclidian distance between at least a plurality of feature vectors in the sequences.

9. The method as recited in claim 4 wherein the transition cost corresponds to an inverse of a weighted distance between at least a plurality of feature vectors in the sequences.

10. The method as recited in claim 8 wherein the inverse of the Euclidian distance is an additive inverse or a multiplicative inverse.

11. The method as recited in claim 9 wherein the inverse of the weighted distance is an additive inverse or a multiplicative inverse.

12. The method as recited in claim 4, wherein the transition cost for remaining in the same state from one frame to the next is zero.

13. The method as recited in claim 4 wherein the dynamic program is further configured to identify boundaries of new segments corresponding to feature vectors aggregating around a new mean in feature space when considered in sequence.

14. The method as recited in claim 1 wherein the input signal is a media signal.

15. The method as recited in claim 4, wherein bias cost minimizes the number of clusters.

16. A segmentation device for segmenting a media signal into a plurality of segments, the device comprising:

a memory buffer configured to receive the media signal; and a processor, wherein the processor is configured:
- to receive the media signal;
- to derive a feature-space sequence of feature vectors from the media signal;
- to condition the feature-space by applying a discriminant transform to the sequence of feature vectors such that separation between clusters of feature vectors is maximized while variance within a cluster is minimized, thereby suppressing spurious peaks in novelty functions based on feature-space distances between sequential samples; and
- to apply a dynamic program to the sequence of feature vectors to identify clusters of feature vectors and boundaries between the clusters, wherein the boundaries between the clusters indicate the segment boundaries,
- wherein the discriminant transform conditions the feature-space based on a training set of representative data; and
- wherein the input signal is an audio signal and the training set of representative data comprises a sampling of music-only signals for determining boundaries between songs, the song boundaries corresponding to the segment boundaries.

17. The device as recited in claim 16, wherein the processor is further configured to utilize the identified segmentation boundaries as navigation indices into the signal.

* * * * *